(12) United States Patent
Niwamae et al.

(10) Patent No.: US 8,834,043 B2
(45) Date of Patent: Sep. 16, 2014

(54) SHUTTER APPARATUS AND IMAGE-PICKUP APPARATUS HAVING THE SAME

(71) Applicants: Canon Kabushiki Kaisha, Tokyo (JP); Canon Denshi Kabushiki Kaisha, Saitama (JP)

(72) Inventors: Yuuki Niwamae, Yokohama (JP); Jun Kawanami, Yokohama (JP); Koichi Shimada, Chichibu-gun (JP); Yoshihiro Sekiya, Tokorozawa (JP)

(73) Assignees: Canon Kabushiki Kaisha, Tokyo (JP); Canon Denshi Kabushiki Kaisha, Saitama-Ken (JP)

( * ) Notice: Subject to any disclaimer, the term of this patent is extended or adjusted under 35 U.S.C. 154(b) by 0 days.

(21) Appl. No.: 13/921,875

(22) Filed: Jun. 19, 2013

(65) Prior Publication Data
US 2013/0343744 A1 Dec. 26, 2013

(30) Foreign Application Priority Data

Jun. 26, 2012 (JP) ................................. 2012-143327
Jun. 26, 2012 (JP) ................................. 2012-143514

(51) Int. Cl.
*G03B 9/08* (2006.01)
*G03B 9/10* (2006.01)

(52) U.S. Cl.
CPC ...................................... *G03B 9/10* (2013.01)
USPC ....................................................... 396/443

(58) Field of Classification Search
USPC .......................................................... 396/443
See application file for complete search history.

(56) References Cited

U.S. PATENT DOCUMENTS 8,596,893 B2 * 12/2013 Nishio et al. .................. 396/443
2006/0198631 A1 * 9/2006 Yamagami ..................... 396/443
2013/0343744 A1 * 12/2013 Niwamae et al. ............. 396/493

FOREIGN PATENT DOCUMENTS

JP            2003-315872 A    11/2003
JP            3990831 A        10/2007

* cited by examiner

*Primary Examiner* — Clayton E LaBalle
(74) *Attorney, Agent, or Firm* — Cowan, Liebowitz & Latman, P.C.

(57) ABSTRACT

A shutter apparatus includes a shutter base plate having an aperture, a blade group configured to open and close the aperture, a blade driving member configured to drive the blade group, a charge lever configured to rotate the blade driving member, a first roller which is attached to a first axis portion extending from the blade driving member and abuts against the charge lever, a cam member configured to rotate the charge lever, and a second roller which is attached to a second axis portion extending from the charge lever and is configured to trace a cam portion formed on the cam member. The cam member has a flange protruding from the cam portion to periphery of the cam member. And the cam member is arranged so that the second roller is overlapped with the flange in an extending direction of the second axis portion.

7 Claims, 12 Drawing Sheets

SHUTTER APPARATUS AND IMAGE-PICKUP APPARATUS HAVING THE SAME

BACKGROUND OF THE INVENTION

1. Field of the Invention

The present invention relates to a shutter apparatus and an image-pickup apparatus having the shutter apparatus.

2. Description of the Related Art

A conventional shutter apparatus rotatably holds blade group divided into a plurality of blades by two arms, and forms a parallel link. The blade group is connected with a blade driving member having a drive spring for blade travelling and an armature electrically attached to a holding electric magnet. In the state of preparation for taking, the armature is abutted against yoke adsorption surface of the holding electric magnet by a charge lever or a charge cam gear so as to hold the blade group.

After release, the charge lever or the charge cam gear evacuates from a blade group holding position, and the blade group is held at a start position by magnetic force of the energized holding magnetic. And imaging operation is operated by a slit exposure using a leading blade group and a trailing blade group or an exposure using an electronic shutter and a trailing blade group when cutting energization of the holding magnet.

After travelling of the blade group, the driving spring is charged by the charge lever or the charge cam gear, and the blade group moves to the position of preparation for taking and waits for next shooting.

In the state of preparation for taking, the blade driving member need to be overcharged so that the armature can certainly abut against the yoke adsorption surface. Generally, overcharge is to further charge the driving spring from the state where the armature abuts against the yoke adsorption surface. In Japanese Patent No. 3990831, a blade driving member has a roller abutting against a charge lever, and overcharge amount of the blade driving member is adjusted by the roller. In other words, the operational amount of the charge lever or a charge cam gear in charge operation is adjusted.

However, in Japanese Patent No. 3990831, a retaining member retaining the roller is needed, and the retaining member needs to dismount the retaining when exchanging the roller. Therefore, there is a problem that exchanging of the roller is troublesome.

Moreover, the roller is generally a metal, and is arranged at a position left from the rotating center of the blade driving member. Therefore, there are problems that inertia of the blade driving member is widely affected, travelling characteristics of the blade driving member is changed by size of the roller, and each travelling characteristics (exposure characteristics) of the shutter apparatus is different.

Additionally, in Japanese Patent Laid-Open No. 2003-315872, a blade room where a blade group travels is provided on an image-pickup element side of a shutter base plate, and a blade driving member and a set member are provided on the opposite side. A through-hole is formed on the shutter base plate, and a blade driving member is inserted into a blade arm via the through-hole.

However, in Japanese Patent Laid-Open No. 2003-315872, attachment error is generated since the rotating axis of the blade arm and the rotating axis of the blade driving member are provided on separate surface of the shutter base plate.

In addition, travel sliding load of the blade group increases and the shutter accuracy degrades by travel sliding load since the blade group fits the rotating axis of the blade arm and the rotating axis of the blade driving member, and slides them.

Moreover, the apparatus enlarges since the surface of the shutter base plate exists between the blade room and the set member

SUMMARY OF THE INVENTION

An object of the present invention is to provide a shutter apparatus which can easily operate adjustment of a charge lever in charge operation and can stabilize travelling characteristics of a blade group.

Additionally, another object of the present invention is to decrease sliding load between a shutter base plate and a blade arm, and to miniaturize the shutter apparatus.

A shutter apparatus as one aspect of the present invention includes a shutter base plate having an aperture for exposure, a blade group configured to open and close the aperture, a blade driving member configured to drive the blade group, a driving spring configured to urge the blade driving member, a charge lever configured to rotate the blade driving member so as to charge the driving spring, a first roller which is attached to a first axis portion extending from the blade driving member and abuts against the charge lever, a cam member configured to rotate the charge lever, and a second roller which is attached to a second axis portion extending from the charge lever and is configured to trace a cam portion formed on the cam member. The cam member has a flange protruding from the cam portion to periphery of the cam member, and the cam member is arranged so that the second roller is overlapped with the flange in an extending direction of the second axis portion.

A shutter apparatus as another aspect of the present invention includes a shutter base plate having an aperture for exposure and an axis, a blade group configured to control exposure by opening and close the aperture, a blade arm member configured to rotatably hold the blade group, and a blade driving member which is supported rotatably by the axis and is configured to drive the blade arm member by rotating around the axis. Both the blade arm member and the blade driving member are arranged on the same side of the shutter base plate, and the blade arm member is fixed on the blade driving member and rotates around the axis.

Further features of the present invention will become apparent from the following description of exemplary embodiments with reference to the attached drawings.

DESCRIPTION OF THE PREFERRED EMBODIMENTS

Exemplary embodiments of the present invention will be described below with reference to the accompanied drawings.

Figure 1:
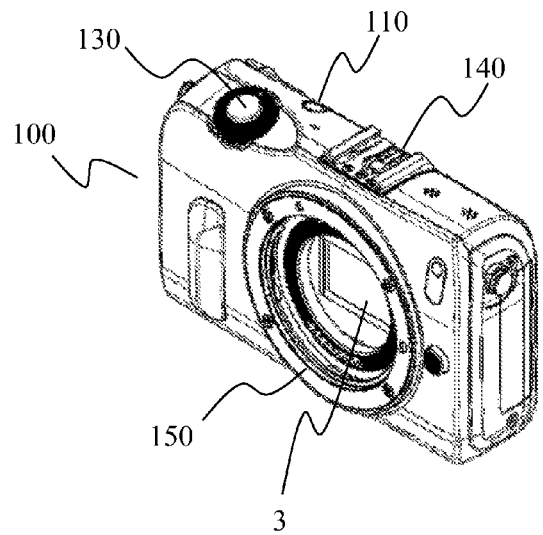
FIG. 1 is an appearance perspective view of an image-pickup apparatus providing a focal plane shutter that is one example of an embodiment of a shutter apparatus of the present invention.

FIG. 1 is an appearance perspective view of an image-pickup apparatus provided with a focal plane shutter that is one example of an embodiment of a shutter apparatus of the present invention.

A power button 110, a release button 130 and an accessory shoe 140 in order to attach a shooting accessory such as a flush apparatus are provided on a top surface of the image-pickup apparatus 100. A lens mount 150 is an attachment of an image-pickup lens not shown in the drawing.

A shutter blade is opened in a standby state for live view display since the image-pickup apparatus 100 is a mirrorless type image-pickup apparatus which does not have a reflex mirror. Therefore, as illustrated in FIG. 1, an image-pickup surface of the image-pickup element 3 is exposed when detaching the image-pickup lens.

Figure 2:
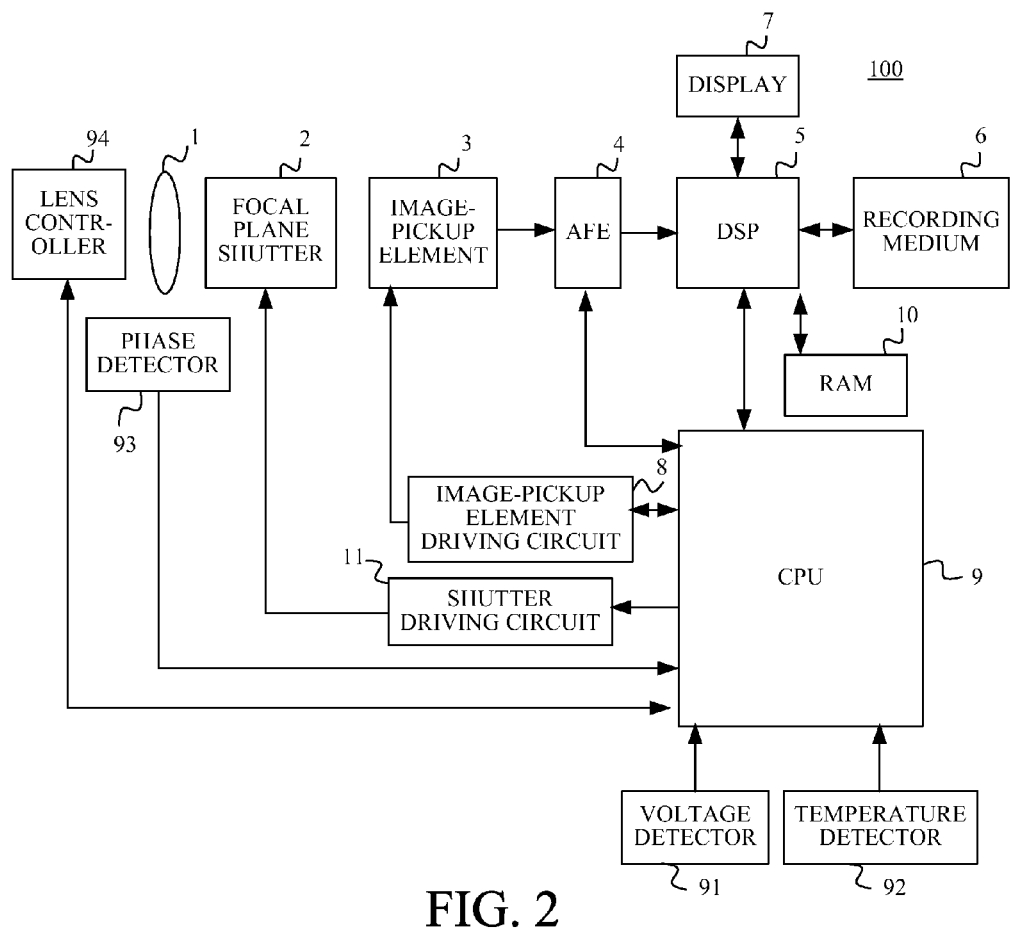
FIG. 2 is a block diagram of the image-pickup apparatus.

FIG. 2 is a block diagram of the image-pickup apparatus 100.

A focal plane shutter (shutter apparatus) 2 is provided between the image-pickup lens 1 and an image-pickup element 3 on an image-pickup optical path, and adjusts time of exposing the image-pickup element 3 in conjunction with an electronic leading blade operation of the image-pickup element 3.

The image-pickup element 3 uses a CMOS image sensor etc., and performs a photoelectric conversion of an object image that is imaged by the image-pickup lens 1 which forms an image based on light from the object. An analog image signal output from the image-pickup element 3 is converted into a digital signal by an AFE (Analog Front End) 4. Various kinds of image processings, a compression processing, and an extension processing are performed for the digital image signal output from the AFE 4 by a DSP (Digital Signal Processor) 5.

A recording medium 6 records the image data processed by the DSP 5. A display 7 uses a liquid crystal display (LCD) etc., and displays a shot image and various kinds of menu screens etc.

An image-pickup element driving circuit 8 performs a drive control of the image-pickup element 3. A RAM 10 is connected with the DSP 5, and transiently stores the image data etc. A shutter driving circuit 11 drives the focal plane shutter 2.

A CPU 9 controls the AFE 4, the DSP 5, the image-pickup element driving circuit 8, and the shutter driving circuit 11.

Reference numeral 91 denotes a voltage detector so as to detect power-supply voltage of the image-pickup apparatus 100, reference numeral 92 denotes a temperature detector so as to detect temperature of the shutter apparatus 100, and reference numeral 93 denotes a phase detector provided inside the focal plane shutter 2 and includes a blade phase detector and a cam phase detector. Reference numeral denotes a lens controller which outputs a focal length, a stop diameter, a pupil diameter and a distance between a pupil and an image-pickup element of the image-pickup lens 1 to the CPU 9, and drives a stop and a lens according to the control of the CPU 9. Detection results of the detectors are input to the CPU 9.

Figure 3A:
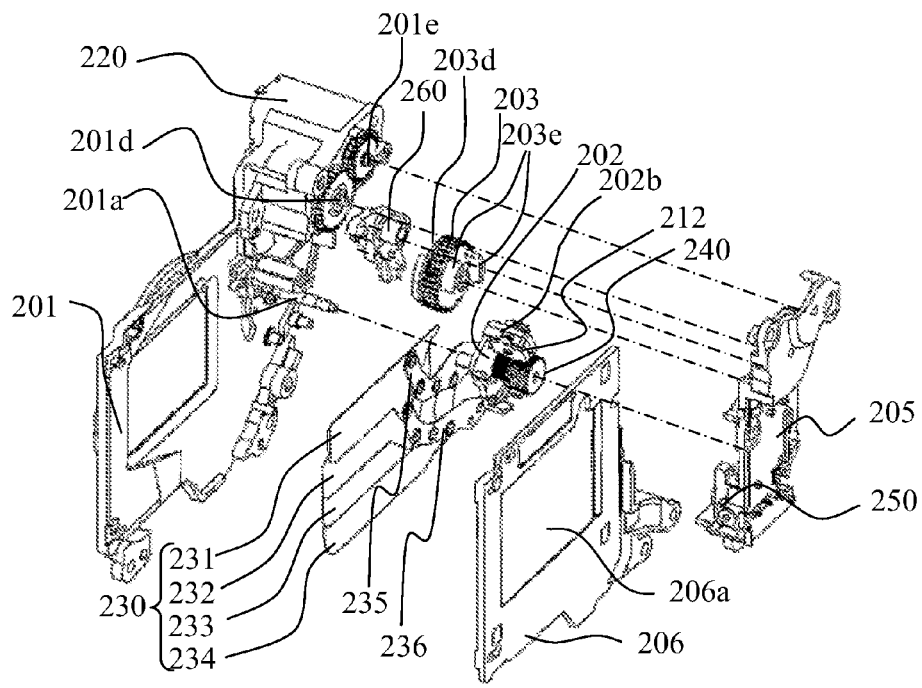
FIGS. 3A and 3B are exploded perspective views of the focal plane shutter.
Figure 3B:
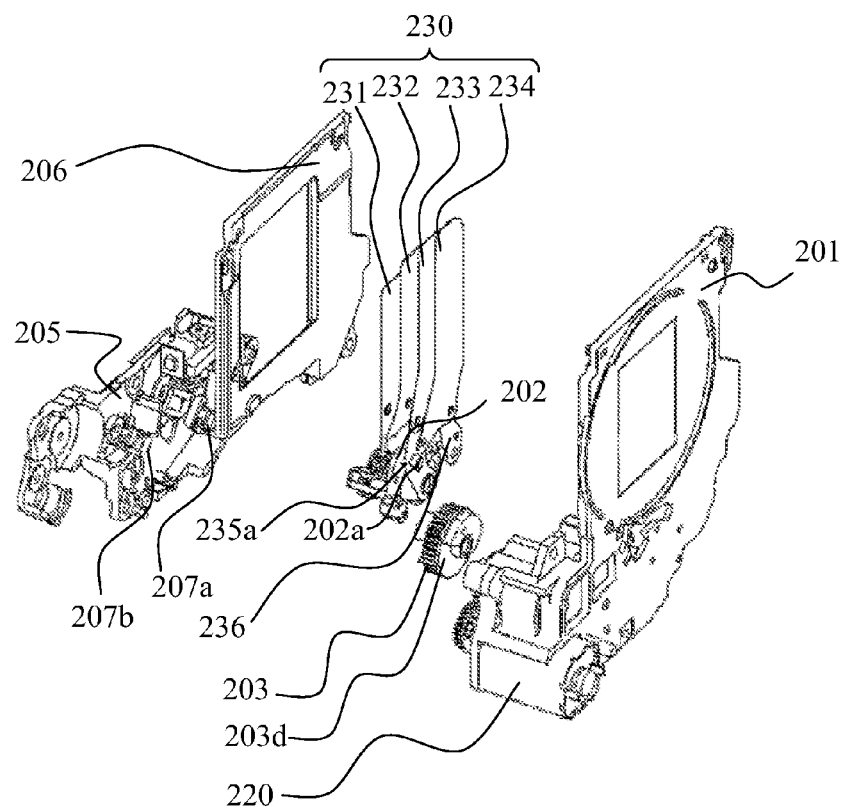
Figure 4:
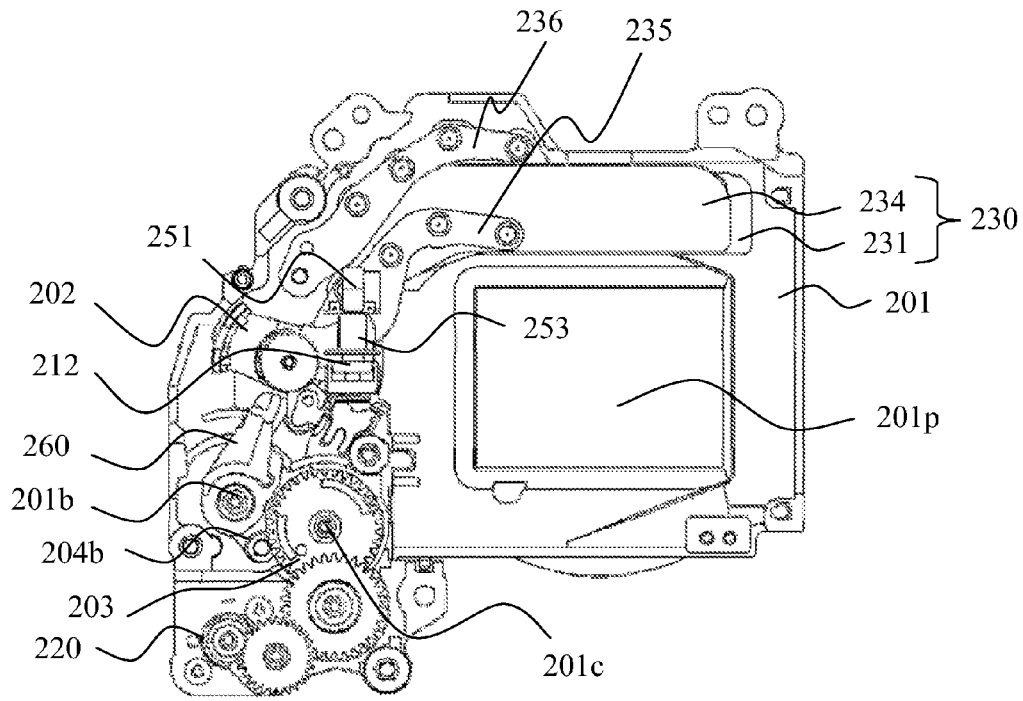
FIG. 4 is a back view of the focal plane shutter.

FIGS. 3A and 3B are exploded perspective views of the focal plane shutter 2. FIG. 3A is an exploded perspective view of the focal plane shutter 2 seen from a side attaching the image-pickup element 3 (hereinafter referred to as "a back side"), FIG. 3B is an exploded perspective view of the focal plane shutter seen from a side attaching the image-pickup lens (hereinafter referred to as "a front side"). FIG. 4 is a back view of the focal plane shutter 2. A supplementary base plate 205 and a cover plate 206 are omitted so as to facilitate visualization of figure.

The shutter base plate 201 is fixed inside the image-pickup apparatus 100, and each component constituting a driving mechanism of a blade group 230 is attached to the shutter base plate 201.

A motor 220 is attached to the shutter base plate 201 so that an output axis is substantially parallel to the image-pickup optical axis (an optical axis of light passing through an aperture 206a). A cam gear 203 rotates by a driving force transmitted from the motor 220 via a reduction gear line that is a transmission member.

A blade driving member 202, the cam gear 203, and the charge lever 260 are rotatably supported by the shutter base plate 201.

In the present embodiment, a charge operation and a charge release operation of the focal plane shutter 2 are performed by transmitting a driving force of the cam gear 203 to the blade driving member 202 via the charge lever 260.

Figure 5:
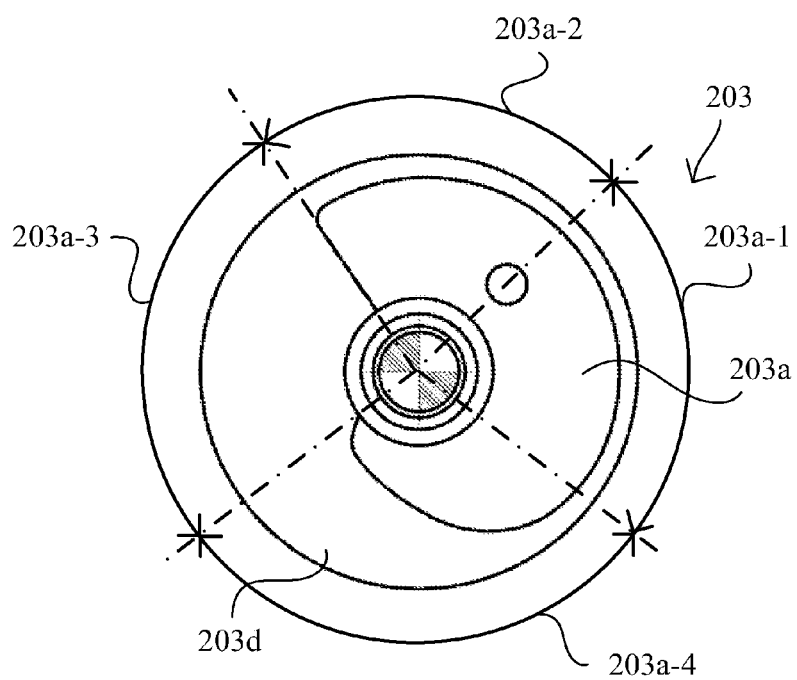
FIG. 5 is a front view of a cam gear.

FIG. 5 is a front view of the cam gear 203. A cam portion 203a is formed on one surface of the cam gear 203. As illustrated in FIG. 5, the cam portion 203a is divided into four regions of a cam top region 203a-1, a cam sloped region 203a-2, a cam bottom region 203a-3, and a charge region 203a-4. Additionally, a flange 203d of the cam gear 203 protrudes from the cam surface of the cam portion 203a to periphery of the cam gear 203.

Figure 6:
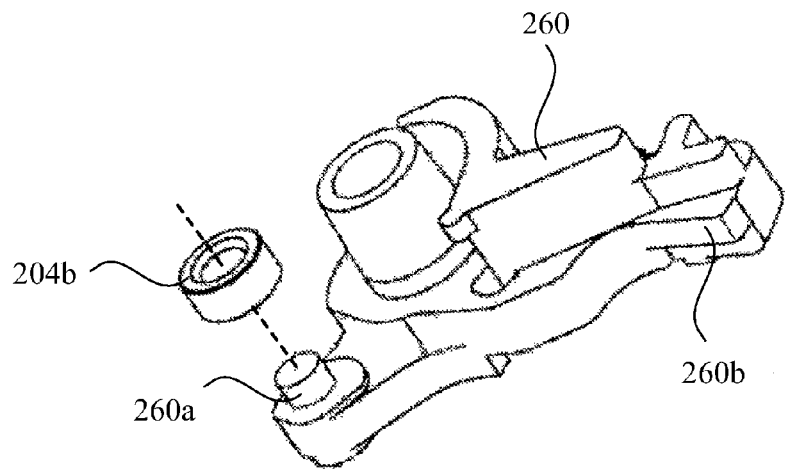
FIG. 6 is an exploded perspective view of a charge lever.

FIG. 6 is an exploded perspective view of the charge lever 260. As illustrated in FIG. 6, the charge lever 260 has an axis portion 260a (a second axis portion) which extends from the charge lever 260, and an abutment 260b. A roller (a second roller) 204b is attached to the axis portion 260a. The abutment 260b abuts against a roller 204a (a first roller) provided on the blade driving member 202. The cam gear 203 drives the charge lever 260 since the roller 204b provided on the axis portion 260a always traces the cam portion 203a of the cam gear 203.

The roller 204b has an adjustment shape in order to adjust overcharge amount, and is exchanged when overcharge amount of the focal plane shutter 2 deviates from a predetermined range. In other words, the roller 204b having optimum outer diameter is selected in many different types of the rollers 204b so as to become overcharge amount within a predetermined range.

Additionally, as illustrated in FIG. 4, the cam gear 203 is arranged so as to overlap with the roller 204b and the flange 203d in an extending direction of the axis portion 260a of the charge lever 260. The roller 204b always overlaps with the flange 203d of the cam gear 203 since the flange 203d is formed all round the cam gear 203. Therefore, even if a retaining member such as a clip is not mounted, the roller 204b does not drop from the axis portion 260a and can be exchanged by just dismounting the cam gear 203. Man hour of exchanging operation of the roller 204b is decreased, and rotating amount of the charge lever 260 can be easily adjusted.

Figure 7:
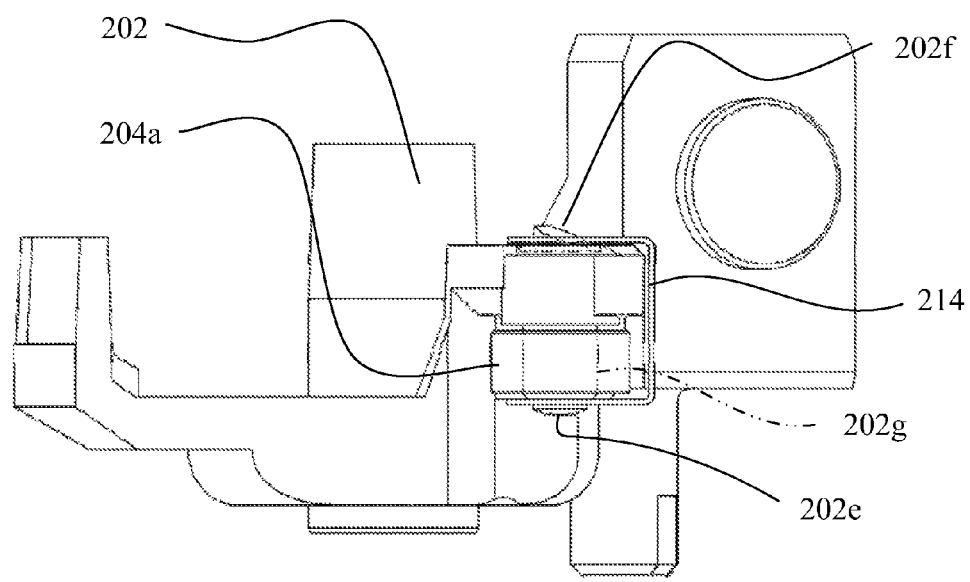
FIG. 7 is an enlarged view of a blade driving member.
Figure 8:
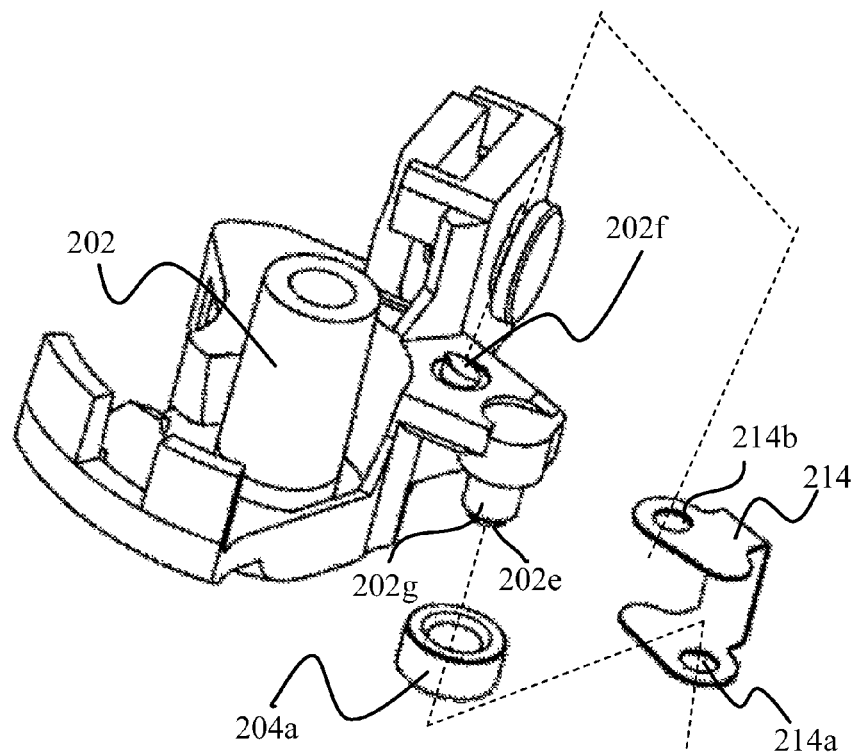
FIG. 8 is an exploded perspective view of the blade driving member.

FIG. 7 is an enlarged view of the blade driving member 202, and FIG. 8 is an exploded perspective view of the blade driving member 202.

When the charge lever 260 rotates the blade driving member 202, the abutment 260b abuts against the roller 204a provided on the blade driving member 202. Therefore, the charge lever 260 is reciprocated. A charge lever back spring (not shown) is attached to the charge lever 260 so as to urge in a direction where the charge lever 260 is apart from the blade driving member 202.

A roller cover 214 is flexible and the cross-section thereof is U-shaped. Additionally, a first hole 214a and a second hole 214b are formed on the roller cover 214. Each position of the first hole 214a and the second hole 214b are symmetrical.

The roller 204a is attached to an axis portion (a first axis portion) 202g extending from the blade driving member 202 before the roller cover 214 is attached to the blade driving member 202.

A first protruding portion 202e formed on the tip of the axis portion 202g engages the first hole 214a of the roller cover 214. The roller cover 214 is elastically deformed so as to engage the second hole 214b of the roller cover 214 with a second protruding portion 202f provided on the blade driving member 202. Therefore, the roller cover 214 is attached to the blade driving member 202. The roller 204a is hold without coming away from the first protruding portion 202e since the roller cover 214 is attached to the blade driving member 202. That is to say, the roller cover 214 works as a retaining member which prevents the roller 204a pivotally supported by the axis portion 202g from coming away from the axis portion 202g.

The roller 204a abuts against the abutment 260b of the charge lever 260 and is held by the roller cover 214 so that the roller 204a can rotate.

A second protruding portion 202f is formed in the direction opposite to the extending direction of the axis portion 202g. The first protruding portion 202e and the second protruding portion 202f are formed on a mutually different axis. Additionally, positions of the first protruding portion 202e and the second protruding portion 202f are symmetrical about a point. Therefore, when the roller cover 214 is attached to the blade driving member 202, the first protruding portion 202e may engage the second hole 214b and the second protruding portion 202f may engage the first hole 214a.

The first protruding portion 202e and the second protruding portion 202f are formed on a mutually different axis. Therefore, if the roller cover 214 is once attached to the blade driving member 202, the roller cover 214 doesn't rotate centering on either of the first protruding portion 202e and the second protruding portion 202f. As a result, since the roller 204a can be positioned, assembly can be improved.

Additionally, since the roller 204a is attached to the blade driving member 202 regardless the blade driving spring, the accuracy of the blade travelling operation is not affected. As discussed above, in this embodiment, the roller 204a is not a part so as to adjust overcharge amount since overcharge amount is adjusted by exchanging the roller 204b. Travelling characteristic of the blade group 230 becomes stable since inertia of the blade driving member 202 does not change by adjustment and is always constant.

Further, in this embodiment, the distance between the center axis of the first protruding portion 202e and the center axis of the second protruding portion 202f is shorter than the distance between the center axis of a joint 202d of the blade driving member 202 and the center axis of the first protruding portion 202e. Therefore, the focal plane shutter 2 can miniaturize than ever before.

Generally, when the blade driving member operates charge operation and charge release operation by the cam gear, cam gear should be arranged apart from the optical axis so as to avoid the collision of the cam gear and the blade driving member. Therefore, since the size of the cam gear need to become large and the cam gear need to rotate one revolution, the problem growing in size of the shutter unit is generated.

On the other hand, in this embodiment, the charge lever 260 is arranged far from the optical axis (the center of an aperture 201p) than the blade driving member 202 in a horizontal direction. The cam gear 203 is arranged close to the optical axis (the center of the aperture 201p) than the blade driving member 202 in a horizontal direction. Additionally, the charge lever 260 charges the blade driving member 202 by reciprocating motion. Therefore, the focal plane shutter 2 can be miniaturized.

Further, in this embodiment, the distance between the rotating center of the charge lever 260 and the abutment of the roller 204a is longer than the distance between the rotating center of the charge lever 260 and the abutment of the roller 204b. Therefore, since the blade driving member 202 can be charged by amplified charge amount of the cam gear 203, the reciprocating motion range of the charge lever 260 can be small. As a result, the focal plane shutter 2 can be miniaturized.

The supplementary base plate 205 is attached by engaging each tip of axis 201a, 201b, 201c, 201d, and 201e of the shutter base plate 201. A holding electric magnet 250 is fixed to the supplementary base plate 205 by a screw 255.

The cover board 206 is fixed to the shutter base plate 201 on the same side as the supplementary base plate 205. The aperture 206a is formed on the position corresponding to the aperture 201p for an exposure of the shutter base plate 201 at the center of the cover board 206 when assembling.

The bladed room so as to arrange the blade group 230 attached to the blade driving member 202 is formed between the shutter base plate 201 and the cover plate 206

The blade group 230 has a first blade 231, a second blade 232, a third blade 233, and a fourth blade 234. The tip of the travelling direction of the first blade 231 (hereinafter referred to as "an aperture forming end") forms an aperture range of the aperture 201p formed on the shutter base plate 201.

Each blade is made from a metallic plate backed on blacking, is rotatably supported by a main arm (a first arm) 235 and a sub arm (a second arm) 236, and forms a parallel link mechanism.

The main arm 235 and the sub arm 236 are sequentially arranged from the aperture forming end side of the first blade 231 along the travelling direction of the blade group 230.

Figure 9:
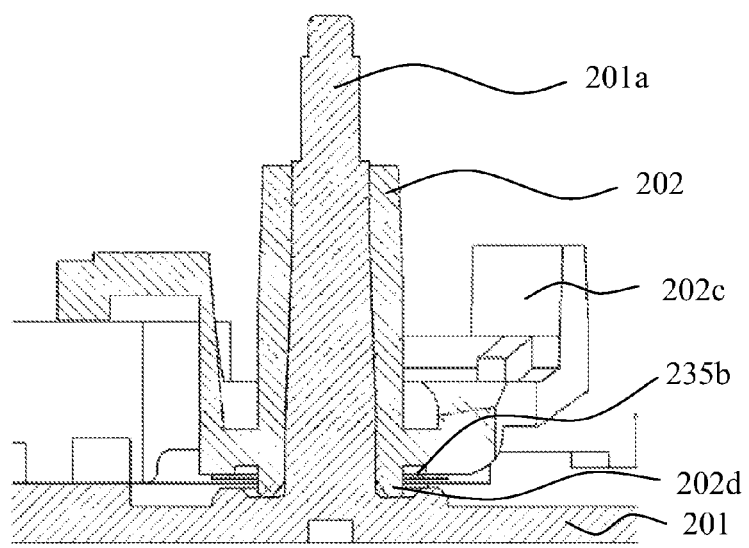
FIG. 9 is a cross sectional view of an axis of a shutter base plate.

FIG. 9 is a cross sectional view of an axis (a third axis) 201a of the shutter base plate 201. As illustrated in FIG. 9, the blade driving member 202 is pivotally supported by the axis 201a of the shutter base plate 201 by inserting the axis 201a of the shutter base plate 201 into the axis supporter 202d of the blade driving member 202.

The hole portion 235b of the main arm 235 engages with an outer periphery of the axis supporter 202d of the blade driving member 202 on an inner surface of the blade room of the shutter base plate 201. In this embodiment, both the main arm 235 and the blade driving member 202 are arranged on the same side of the shutter base plate 201, and rotate around the axis 201a of the shutter base plate 201.

A driving pin 202a is formed on the tip of the blade driving member 202, and the driving pin 202a connects with a hole 235a formed on the main arm 235 and penetrates a long hole portion 201g formed on the shutter base plate 201.

When the driving pin 202a moves along the long hole portion 201g by rotating of the shouter driving member 202, the main arm 235 rotates centering on the hole portion 235b and with this, operates opening and closing of the blade group 230. When the blade group 230 operates, the aperture 201p can become an opening state (a state capable of passing light) or a shielding state (a state capable of shielding light).

Since the blade group 230 rotates along with the main arm 235 and the blade driving member 202 only by engaging with the main arm 235, a sliding friction generated in the blade group 230 is reduced.

The sub arm 236 is pivotally supported by an axis 201f provided on the shutter base plate 201, and additionally, a blade spring for backlash is hooked in a direction to travel the blade group 230.

A ratchet gear 240 is pivotally supported by the axis 201a of the shutter base plate 201, and is arranged at the tip of the axis than the blade driving member 202. The ratchet gear 240 engages with the ratchet click formed on the shutter base plate 201.

A blade driving spring (an elastic member) which is not shown in the drawing and is a torsion coil spring is arranged between the blade driving member 202 and the ratchet gear 240. One end of the blade driving spring hangs the blade driving member 202 and the other end hangs the ratchet gear 240. Urging force of the blade driving spring is adjusted by changing the engagement position of the ratchet gear 240 and the ratchet click. The blade driving spring urges the blade driving member 202 in a clockwise direction in FIG. 4.

A first photointerrupter 207a and a second photo interrupter 207b which are non-contact phase detectors are attached to the supplementary base plate 205. The first photointerrupter 207a corresponds to a first optical detector and the second photointerrupter 207b corresponds to a second optical detector.

A detected part 202c is formed on the blade driving member 202, and a blade phase detector is configured by the first photointerrupter 207a and the detected part 202c.

When the blade driving member 202 is positioned at a charge completed position, the detected part 202c is provided so that the detected part 202c can shield the first photointerrupter 207a. Therefore, when the blade driving member 202 is positioned at the charge completed position, the detected part 202c shields the first photointerrupter 207a. At this time, the first photointerrupter 207a outputs H signal. Similarly, when the blade driving member 202 is positioned at a travelling completed position, the detected part 202c is provided so that the detected part 202c can shield the first photointerrupter 207a. Therefore, when the blade driving member 202 is positioned at the travelling completed position, the detected part 202c doesn't shield the first photointerrupter 207a. At this time, the first photointerrupter 207a outputs L signal.

A detected part 203e is formed on an opposite surface of the surface of the cam gear 203 where the cam portion 203a is formed. A cam phase detector is configured by a second photointerrupter 207b and the detected portion 203e.

When the roller 204b traces the cam top region 203a-1 of the cam portion 203a, the detected part 203e shields the second photointerrupter 207b. At this time, the second photointerrupter 207b outputs H signal. When the roller 204b traces the cam bottom region 203a-3 of the cam portion 203a, the detected part 203e shields the second photointerrupter 207b. At this time, the second photointerrupter 207b outputs L signal. The state where the roller 204a traces the cam top region 203a-1 of the cam portion 203a is said that the cam gear 203 is in a cam top phase. The state where the roller 204b traces the cam bottom region 203a-3 of cam portion 203a is said that the cam gear 203 is in a cam bottom phase.

Here, the composition of the cam phase detector that is configured by the second photointerrupter 207b and the detected part 203e is described.

Figures 10A, 10B:
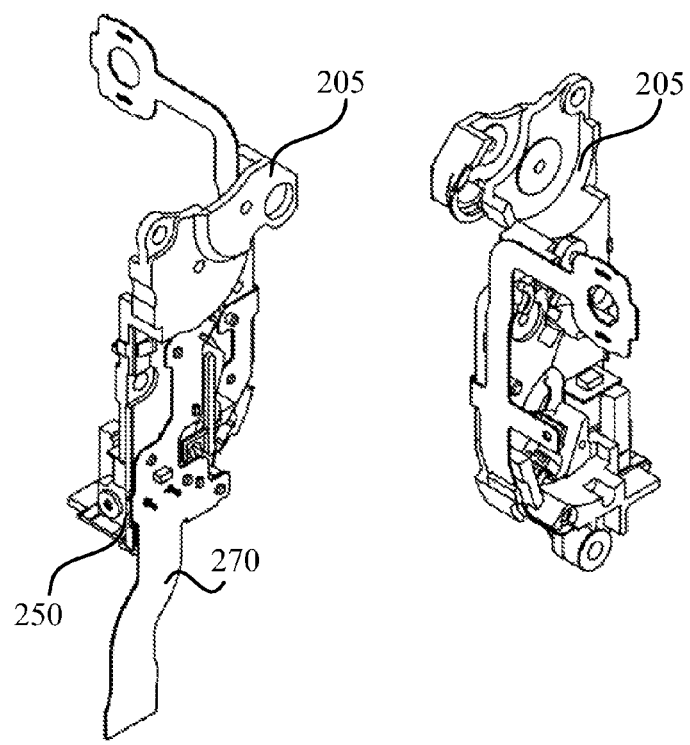
FIGS. 10A and 10B are perspective views of a supplementary base plate.
Figure 11:
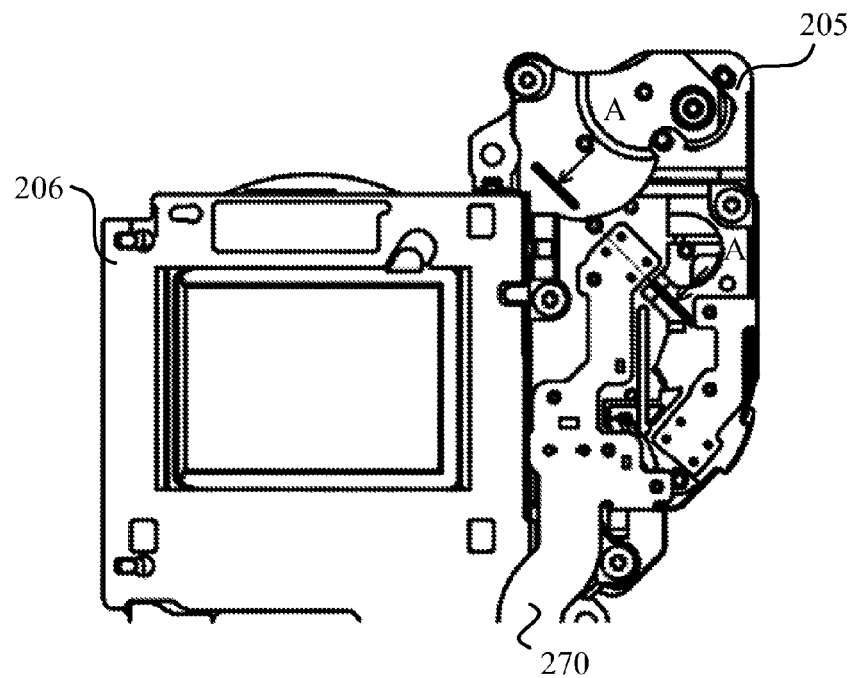
FIG. 11 is a back view of the focal plane shutter assembling a flexible plate.
Figure 12:
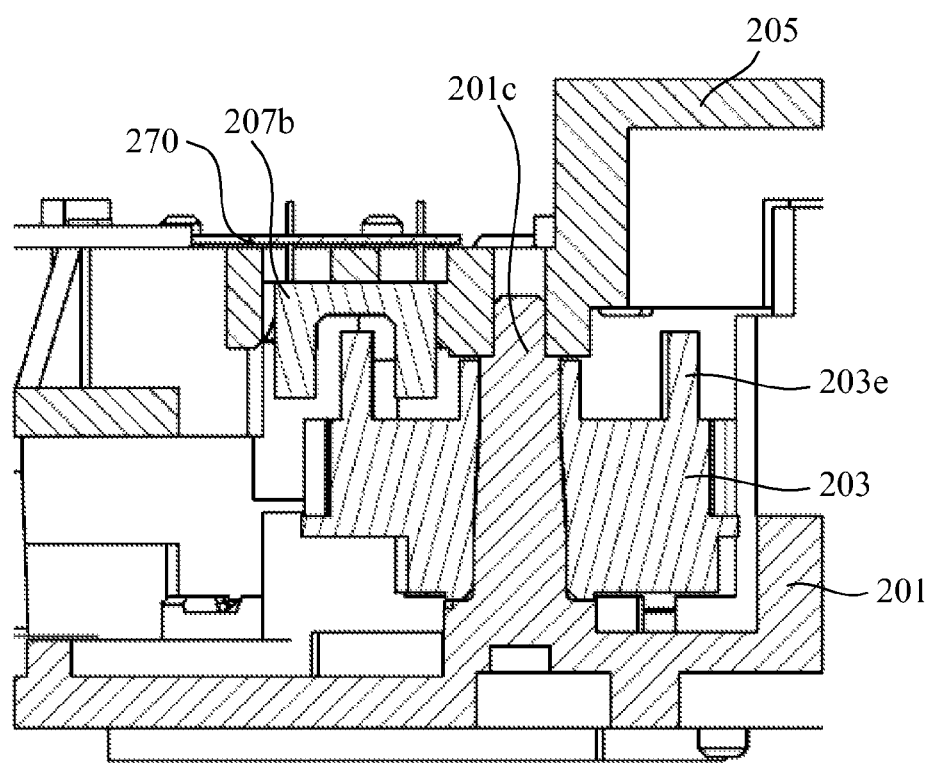
FIG. 12 is a cross sectional view taken along line A-A of FIG. 11.

FIGS. 10A and 10B are perspective views of the supplementary base plate 205 assembling a flexible substrate 270. FIG. 10A is a front view and FIG. 10B is a back view. FIG. 11 is a back view of the focal plane shutter 2 assembling the flexible plate 270. FIG. 12 is a cross sectional view taken along line A-A of FIG. 11.

As illustrated in FIG. 12, the axis 201c formed on the shutter base plate 201 is a rotating center of the cam gear 203 and engages the supplementary base plate 205. The flexible substrate 270 is attached to the supplementary base plate 205.

Since the second photointerrupter 207b is attached to the flexible substrate 270, the second photointerrupter 207b is arranged between the flexible substrate 270 and the surface where the detected part 203e of the cam gear 203 is formed. According to the position of the detected part 203e, attachment position of the second photointerrupter 207b is changed and at the same time, wiring of the flexible substrate 270 is also changed.

In this embodiment, since the detected part 203e is vertically arranged in the same direction as the protruding direction of the axis 201c, the second photointerrupter 207b is arranged near the axis of the cam gear 203 as illustrated in FIG. 12. At this time, as illustrated in FIGS. 10A and 10B, the focal plane shutter 2 can be miniaturized since the wiring of the flexible substrate 270 can be simplified.

Additionally, in this embodiment, the reliability increases since aging degradation such as detection defect by a particle and oil etc and removing of the pattern of the flexible substrate doesn't generate unlike a contact phase detector such as a brush etc.

By the way, when the photointerrupter detecting that the cam gear 203 is positioned at the cam top phase and the photointerrupter detecting that the cam gear 203 is positioned at the cam bottom phase are separately provided, two detected parts need to be attached at different positions in the radial direction of the cam gear 203. However, the diameter of cam gear 203 extremely enlarges.

In this embodiment, one photointerrupter detects that the cam gear 203 is positioned at the cam top phase, and the cam gear 203 is positioned at the cam bottom phase. Therefore, the detected part so as to detect that the cam gear 203 is positioned at the cam top phase and the detected part so as to detect that the cam gear 203 at the cam bottom phase are vertically arranged on the same circle of the cam gear 203, and the outside diameter of the cam gear 203 doesn't grow in size. Moreover, since the detected part 203e is arranged at the rotating center side than the cam surface of the cam portion 203a, the focal plane shutter 2 can be miniaturized. Additionally, the blade driving member 202 reciprocates and only the running path of the detected part 202c makes the focal plane shutter 2 big. Further, the detected part 202c contributes to the miniaturization of the image-pickup apparatus 100 since the detected part 202c has the possibility of design than another detected part is provided on the cam gear 203 rotating and can be arranged according to the space of the image-pickup apparatus 100.

Figure 13:
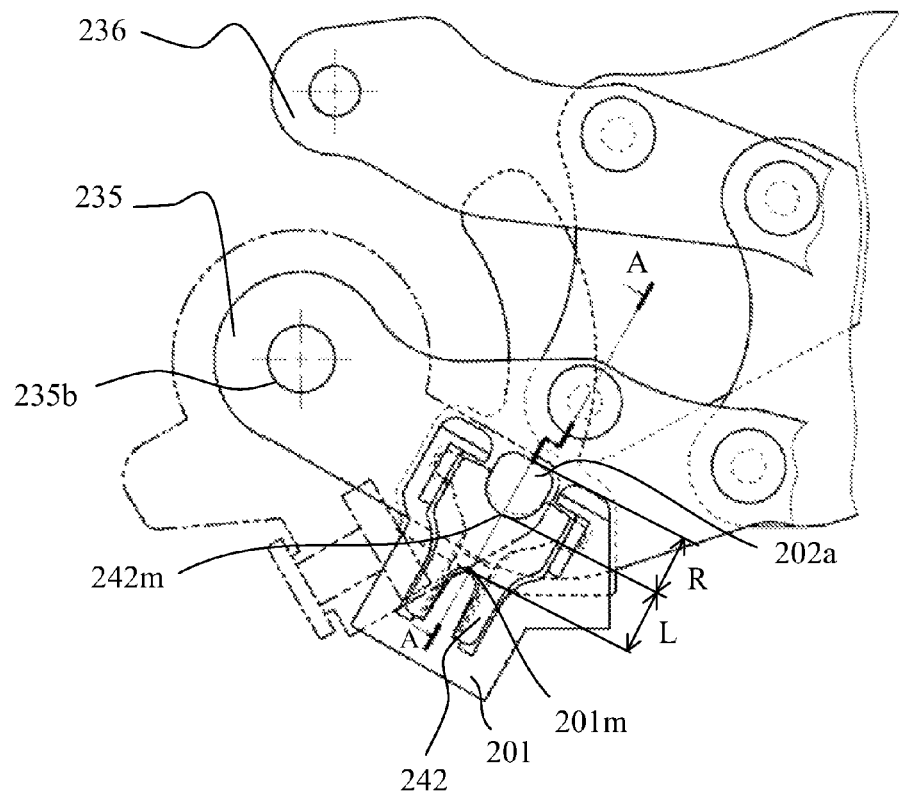
FIG. 13 is an enlarged view of a part of the focal plane shutter.
Figure 14:
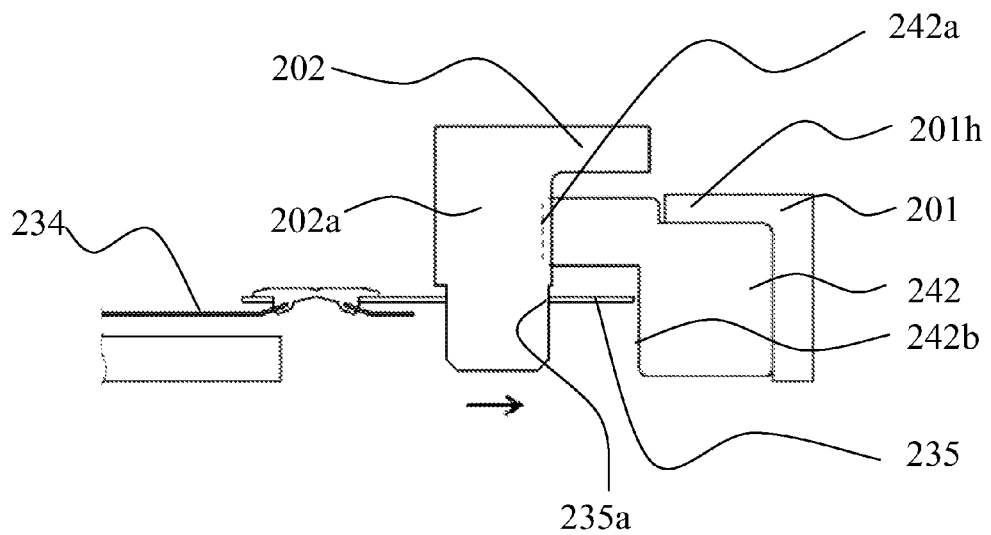
FIG. 14 is a cross sectional view taken along line A-A of FIG. 13.

FIG. 13 is an enlarged view of a part of the back view of the focal plane shutter 2. FIG. 14 is a cross sectional view taken along line A-A of FIG. 13, and the upper side shows the outside of the blade room and the lower side shows the inside of the blade room.

Figure 15:
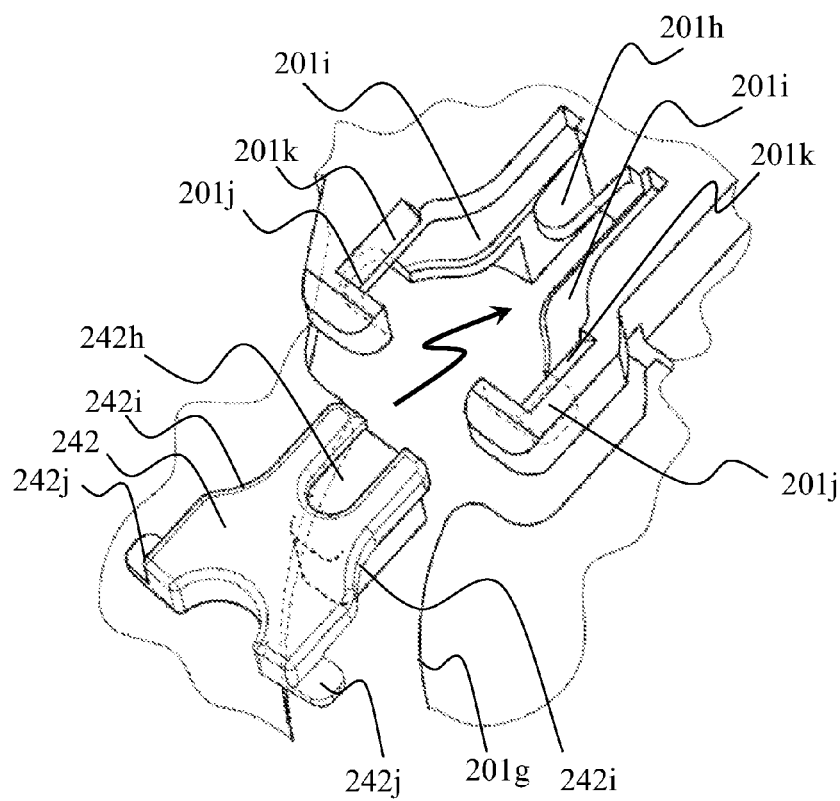
FIG. 15 is a perspective view showing the state before a buffer member is attached to the shutter base plate.

FIG. 15 is a perspective view showing the state before a buffer member 242 is attached to the shutter base plate 201 from the point of view of the inside of the blade room.

The buffer member 242 is made from the material such as rubber, and attached to the end of the long hole portion 201g of the shutter base plate 201. Since the blade diving material 202 collides against the buffer material 242 at the surface which is perpendicular to the travelling direction of the driving pin 202a, the buffer material 242 absorbs the impact of sudden stopping of the blade driving member 202. Therefore, the buffer material 242 can improve the durability of the blade driving member 202 and can suppress the bound when completing the travelling.

Along a circular rim of the long hole portion 201g, a first convex portion 201h and a pair of concave portions (a second concave portion) 201i are formed outside of the blade room, and a pair of concave portions (a first concave portion) 201j is formed inside of the blade room.

In the buffer member 242, a concave portion (a third concave portion) 242h is formed outside of the blade room, and a pair of convex portions (a third convex portion) 242i and a pair of convex portions (a second convex portion) 242j are formed inside of the blade room.

Here, the method of attaching the buffer member 242 to the long hole portion 201g of the shutter base plate 201 is described.

First of all, the concave portion 242h of the buffer member 242 is inserted under the convex portion 201h of the shutter base plate 201. At this time, the pair of convex portions 242j of the buffer member 242 are positioned at a pair of tapered surfaces 201k formed on the shutter base blade 201.

Next, the buffer member 242 is inserted by transforming so that the pair of convex portions 242j of the buffer member 242 fit in the pair of concave portions 201j of the shutter base plate 201.

After the buffer member 242 is attached to the end of the long hole portion 201g of the shutter base plate 201, restoring force works on the buffer member 242. Therefore, the concave portion 242h, the pair of convex portions 242i, and the pair of the convex portions 242j abuts against the convex portion 201h, the pair of concave portion 201i, and the pair of concave portion 201j of the shutter base plate 201, respectively.

At this time, as illustrated in FIG. 14, the buffer member 242 is arranged in the board thickness of the shutter base plate 201 and doesn't protrude outside of the blade room. Therefore, the buffer member 242 doesn't interfere with other components attached to the shutter base plate 201, and there is no design restriction.

In the above configuration, the buffer member 242 is preferably attached to the long hole 201g formed on the shutter base plate 201, and is arranged in the board thickness of the shutter base plate 201 even if vibration is applied to the buffer member 242 in the vertical direction.

As illustrated in FIG. 13, in the buffer member 242, distance L between a part 242m which is an abutment of the driving pin 202a and the buffer member 242 and is the closest to the shutter base plate 201, and a tip 201m of the first convex portion 201h is larger than a length R of the driving pin 202a in the attachment direction.

As a result, since the strength of the buffer member 242 can be stronger, the durability thereof can be improved.

Figure 16:
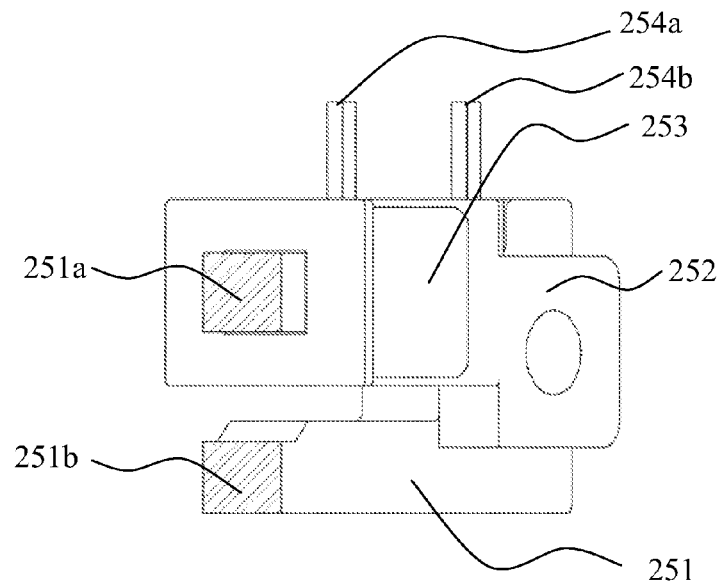
FIG. 16 is a diagram where an electric magnet is seen from an adsorption surface side of a yoke.

FIG. 16 is a diagram where the holding electric magnet 250 is seen from adsorption surfaces 251a, 251b of a yoke 251.

The yoke 251 is a horseshoe-shaped having a first leg portion and a second leg portion. A bobbin 252 wound by a coil 253 is provided on the first leg portion.

Terminal pins 254a and 254b connected with each of both ends of the coil 253 are formed on the bobbin 252.

An amateur supporting portion 202b shown in FIG. 3A is provided on the blade driving member 202. An amateur axis which extends to the adsorption surface of the amateur 212 in a substantially perpendicular direction and attached to the amateur 212 engages a through-hole (not shown) formed on the amateur supporting portion 202b. A compression spring (not shown) is arranged at outer periphery of the amateur axis, and urges so that the amateur 212 and the amateur supporting portion 202b are apart from each other.

When the voltage is applied between a terminal pin 254a and a terminal pin 254b, the coil 253 generates the flux of magnetic flux.

At this time, an adsorption surface 251a of the first leg portion and an adsorption 251b of the second leg portion works as an adsorption surface with the amateur 212.

A cross-sectional view of the amateur 212 is the smallest in a magnetic circuit formed by the yoke 251 and the amateur 212 in this embodiment. Therefore, magnetic flux generated in the magnetic circuit is decided by saturated amount of magnetic flux density of a cross-sectional view of the amateur 212.

In this embodiment, the size of the amateur 212 is designed so that inertia moment of the blade driving member 202 is reduced, and the stiffness and the strength don't weaken too much.

Leakage magnetic flux normally exists in the magnetic circuit. Flux content ΦY1 generated on the adsorption surface 251a of the yoke 251 is larger than flux content ΦA generated on the cross-sectional surface of the amateur 212 since the adsorption surface 251a of the yoke 251 is close to the coil 253 which is a source of generation than the amateur 212.

On the other hand, flux content ΦY2 generated on the adsorption surface 251b of the yoke 251 is smaller than flux content ΦA generated on the cross-sectional surface of the amateur 212 since the adsorption surface 251b of the yoke 251 is away from the coil 253 which is a source of generation than the amateur 212.

A magnetic adsorption force that operates to each adsorption surface of the yoke 251 can be shown by using the next expression.

[Number 1]

$$F = \frac{1}{2\mu}B^2 S = \frac{1}{2\mu} \cdot \frac{\Phi^2}{S} \quad (1)$$

Here, F is an adsorption force operating an adsorption surface, μ is a magnetic permeability, B is a magnetic flux density of the adsorption surface, S is an area of the adsorption surface and Φ is a flux content.

The flux content ΦY1 generated on the adsorption surface 251a is larger than the flux content ΦY2 generated on the adsorption side 251b as mentioned above. Then, in this embodiment, the area of the adsorption surface 251b is adjusted to be smaller than the area of the adsorption surface 251a so that the adsorption force generated on each surface is equal. Therefore, when the exposure starts after stopping of energization to the coil, the amateur 212 can break away from both the adsorption surface 251a and the adsorption surface 251b at the same time.

Therefore, time until the driving member material drives is constant, and the difference of the exposure time can be controlled.

At least one of the amateur 212 and the yoke 251 is made from permalloy.

The shooting operation of this embodiment is described by using FIGS. 17A-17D and FIG. 18.

FIGS. 17A-17D are operational diagrams of the blade group 230 of the focal plane shutter 2. In FIGS. 17A-17D, the supplementary base plate 205 and the cover plate 206 are omitted so as to facilitate visualization of figures. FIG. 18 is a diagram of illustrating the operational timing of the focal plane shutter 2 and the image-pickup element 3. (1)-(10) in FIG. 18 corresponds to each operational state.

Figure 17A:
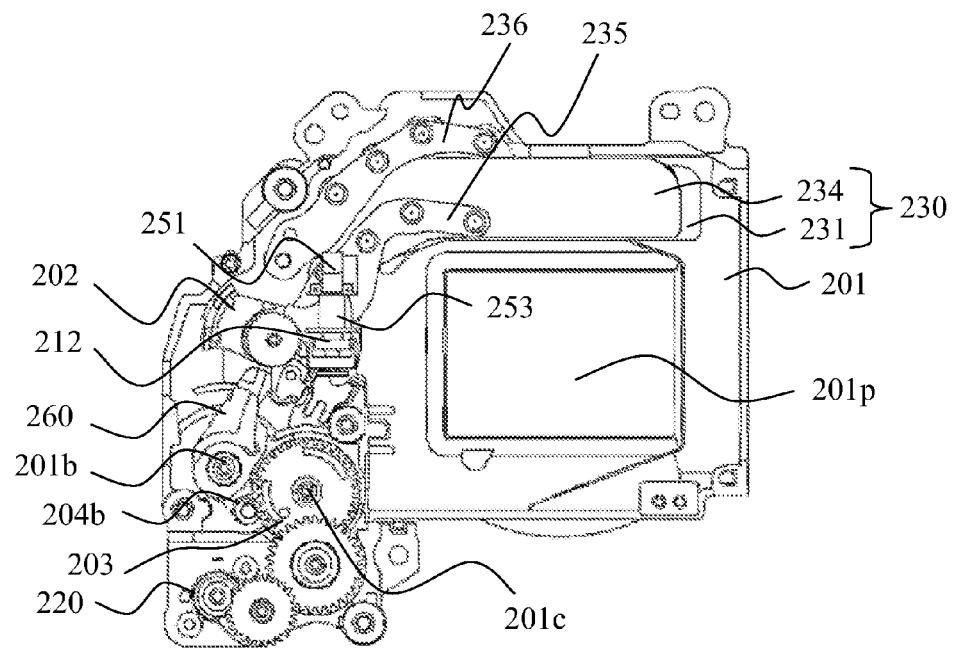
FIGS. 17A to 17D are operational diagrams of the blade group of the focal plane shutter.
Figure 17B:
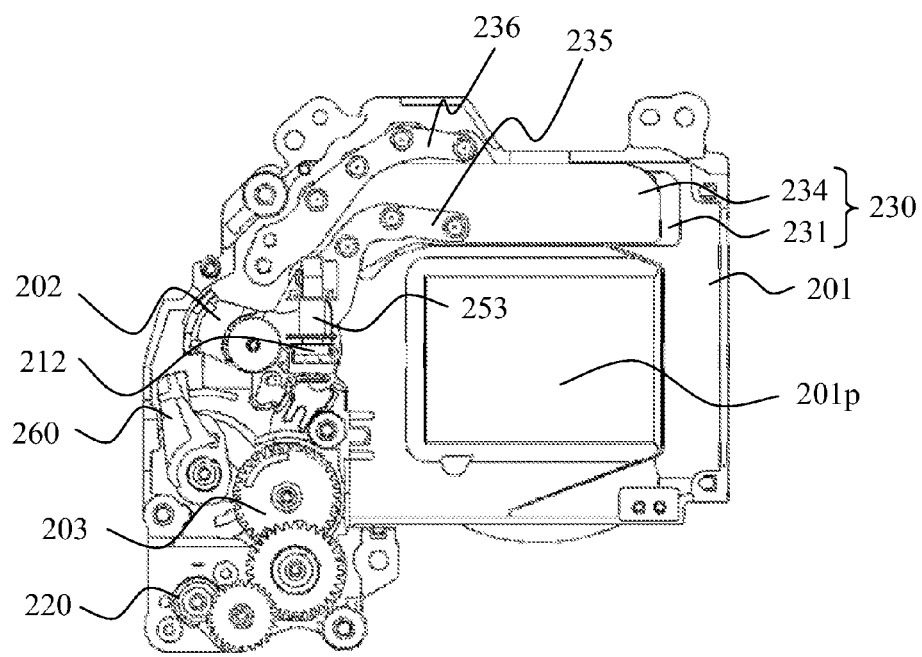
Figure 17C:
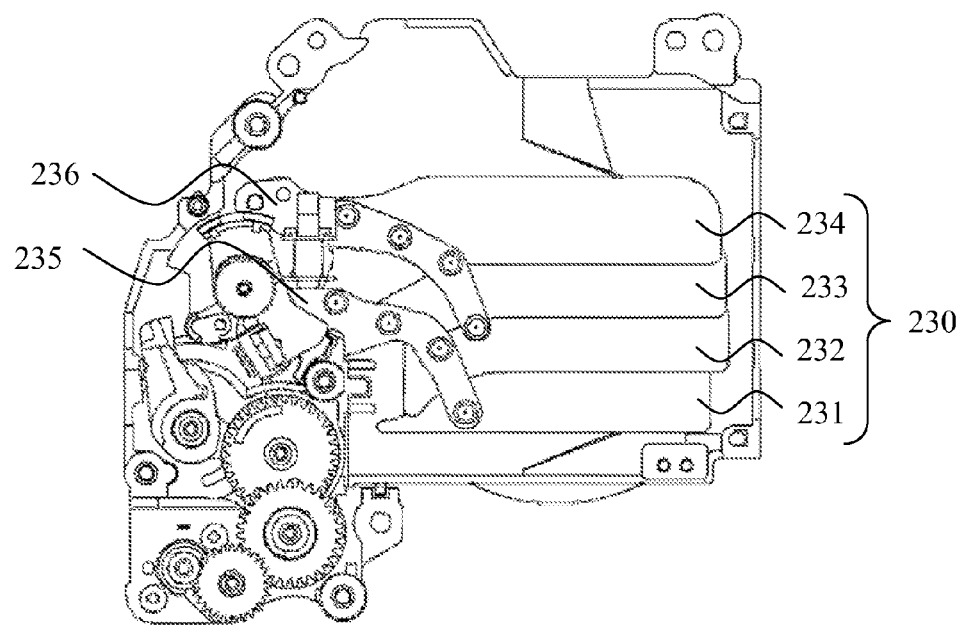
Figure 17D:
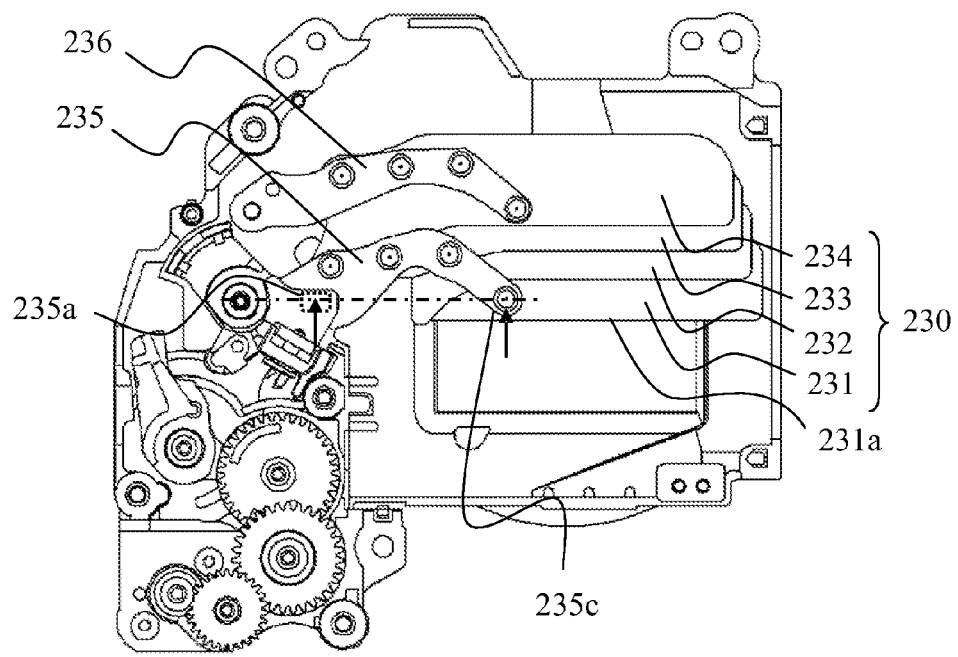
Figure 18:
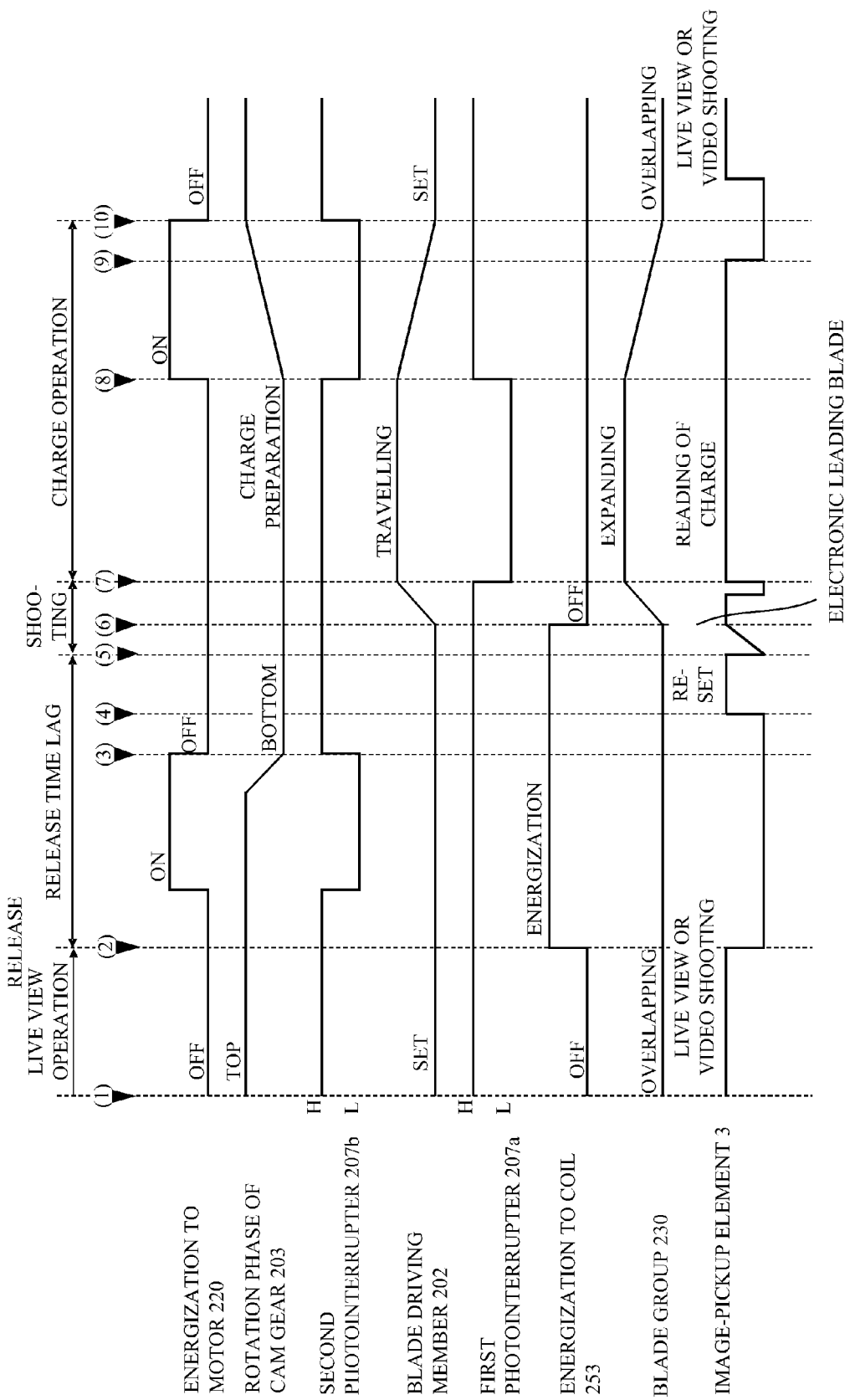
FIG. 18 is a diagram of illustrating the operational timing of the focal plane shutter and the image-pickup element.

FIG. 17A illustrates the overcharge state of the blade driving member 202, which is the stopping state of the image-pickup apparatus 100 and is the live view state. Additionally, FIG. 17B illustrates the travelling standby state of the blade group 230, and FIG. 17C illustrates the travelling completed state of the blade group 230. FIG. 17D illustrates the state where the aperture forming end 231a of the first blade 231 on the halfway of exposure control operating from the state of FIG. 17A to the state of FIG. 17C shields substantially half of the aperture 201p.

In FIG. 18(1), the focal plane shutter 2 is the overcharge state as like FIG. 17 and can pass the light since the blade group 230 is overlapped.

In the image-pickup apparatus 100, when the live view taking picture operation is operated, the object image incident to the image-pickup element 3 is displayed on an image display (not shown). At this time, the CPU 9 checks whether the first photointerrupter 207a and the second photointerrupter 207b output H signal. That is, confirmation that the blade driving member 202 is the charge completed state and the cam gear 203 is the cam top phase is conducted. If the first photointerrupter 207a or the second photointerrupter 207b outputs L signal, the CPU 9 instructs the shutter driving circuit 11 so as to energize the motor 220. The shutter driving circuit 11 energizes the motor 220 until the first photointerrupter 207a and the second photointerrupter 207b output H signal.

In this embodiment, since one photointerrupter conducts the phase detection of the cam gear 203, the one photointerrupter outputs H signal whether the cam gear 203 is the cam top phase or the cam bottom phase. At this time, when the charge completed state of the blade driving member 202 is detected from output of the first photointerrupter 207a, the phase detector 93 can detect the cam top phase of the cam gear 203.

When the CPU 9 controls the shutter driving circuit 11 by beginning of the release operation (FIG. 18 (2)), the shutter driving circuit 11 energizes the coil 253 and the yoke 251 generates magnetic energy so as to make the yoke 251 and the amateur 212 adsorption state.

After making the yoke 251 and the amateur 212 adsorption state, the shutter driving circuit 11 energizes the motor 220 and the cam gear 203 is rotated in the counterclockwise direction. The roller 204a transfers from the state tracing the cam top region 203a-1 to the state tracing the cam sloped region 203a-2. When the charge lever 260 traces the cam sloped region 203a-2, the overcharged state is gradually released. And when the roller 204a becomes the state tracing the cam bottom region 203a-3, the blade group 230 becomes travelling standby state as illustrated in FIG. 17B. Additionally, when the second photointerrupter 207b becomes the state outputting H signal from the state outputting L signal, the shutter driving circuit 11 stops energizing to the motor 220 (FIG. 18(3)).

When the CPU 9 controls the image-pickup element driving circuit 8, the image-pickup element driving circuit 8 makes all pixels of the image-pickup element 3 a reset state (FIG. 18(4)). After, the image-pickup element driving circuit 8 starts electronic leading blade scanning (FIG. 18(5)) by controlling of the CPU 9. The reset state which makes all pixels of the image-pickup element 3 reset is kept between FIG. 18(4) and FIG. 18(5).

Here, electronic leading blade scanning is to start charge accumulation at each line of the image-pickup all image elements of the image-pickup element 3 whose all pixels are the reset state. Since scanning pattern starting charge accumulation at each line is suited to travelling characteristic of the blade group 230, charge time (exposure time) of every line of the image-pickup element 3 is uniform. When the CPU 9 controls the shutter driving circuit 11, electronic leading blade scanning is started, and the shutter driving circuit 11 stops energizing to the coil 253 after time interval corresponding to a set shutter speed. As a result, the adsorption force power that works between the yoke 251 and the amateur 212 extinguishes (FIG. 18(6)). Additionally, the blade driving member 202 starts to rotate in a clockwise direction by urging of the torsion coil spring. Then, as mentioned above, since the adsorption forces working at two adsorption surfaces of the yoke 251 and the amateur 212 are equal, two adsorption surfaces of the yoke 251 and the amateur 212 secede from each other at the same time. As a result, the difference of driving timing of the blade driving member 202 is controlled when energizing to the coil 253 is cut.

At this time, the first driving blade 231 is transmitted the driving force through a driving force transmitted portion 235c of the main arm 235 in the exposure process from the state of FIG. 17A to the state of FIG. 17C. Since the driving force transmitted portion 235c is provided on the position that is an exposure direction side than center of the first blade 231, the first blade 231 operates by pulling of the main arm 235.

The aperture forming end 231a stably travels without blurring in the optical axis direction since the blade driving member 202 rotates the first blade 231 through the driving force transmitted portion 235c of the main arm 235.

Moreover, since the first blade 231 operates by pulling the sub arm 236, the sub arm is operated by pulling of the main arm 235.

The second blade 232, the third blade 233, and the forth blade 234 serially operates as the first blade 231, and pulls the main arm 235 and the sub arm 236. The operational amount of the first blade 231 is the largest, and the operational amount is small in order of the second blade 232, the third blade 233, and the forth blade 234.

In this embodiment, the hole 235a of the main arm 235 is formed on substantially straight line connected the center of the axis 201a which is the rotating center of the main arm 235 and the pivotally supporting center of the first blade 231. Therefore, as an arrow of FIG. 17D, a rotating normal direction of a position where the main arm 235 and the first blade 231 are pivotally supported, i.e., the travelling direction of the blade group 230 and a normal direction at the center of the rotating trace of the driving pin 202a of the blade driving member 202 are substantially same. The state where the aperture 201p shown in FIG. 17D is half shielded can transmit the driving force of the blade driving member 202 to the first blade 231 in the most efficient way.

Transmission efficiency of driving force of the blade driving member 202 at both travelling starting state of the blade group 230 and travelling completed state of the blade group 230 is substantially same, and travelling characteristic is stable.

In this embodiment, the blade driving member 202 and the main arm 235 are another material. However, the blade driving member 202 and the main arm 235 are integrated by integral molding such as fastening, heat adhesion, molding insert, and molding autosert, and at least one fixing part may be provided at the position of the driving pin 202a.

When the blade driving member 202 more travels, the driving pin 202a abuts against an abutment (first abutment) 242a. After, the when the blade driving member 202 more travels in the state where the buffer member 242 is compressed the driving pin 202a, the main arm 235 crushes an abutment (second abutment) 242b and stops by being absorbed of impact as illustrated in FIG. 14. Thus, the blade driving member 202 and the main arm 235 are efficiently absorbed by the abutments 242a, 242b of the buffer member 242, respectively, and exposure of the blade group 230 is finished. Therefore, the aperture 201p of the shutter base plate 201 is the state where light is shielded as illustrated in FIG. 17C (FIG. 18(7)).

When travelling of the blade group 230 of the focal plane shutter 2 ends, and the image-pickup element 3 is shielded completely, the image-pickup element driving circuit 8 starts still picture reading scanning by controlling of the CPU 9. Then, the CPU 9 checks whether or not each of the first photointerrupter 207a and the second photointerrupter 207b outputs L signal. That is to say, the confirmation that the blade driving member 202 is the travelling completed state and the cam gear 203 is cam bottom phase is conducted. If the first photointerrupter 207a or the second photointerrupter 207b outputs H signal, taking image operation is stopped and the display 7 displays error since abnormal state of the blade group 230 and the blade driving member 202 may be suspected.

The area where the charge reading of the image-pickup element 3 is not completed should be kept the state shielding light.

After the predetermined time (FIG. 18(8)) from starting the reading of charge of the image-pickup element 3, when the CPU 9 controls the shutter driving circuit 11, the shutter driving circuit 11 energizes to the motor 220 and rotates the cam gear 203 in counterclockwise direction. Therefore, the charge operation is conducted by rotating the blade driving member 202 against the urging force of the torsion coil spring in the clockwise direction. Then, the blade group 230 is gradually overlapped and the aperture 201p is sequentially opened from the line where reading of charge of the image-pickup element 3 is completed. That is to say, before completing of reading of charge of all pixels, the aperture 201p starts to open. Then, timing of start of charge is set so that leakage light from opening part of the blade group 230 doesn't enter to a pixel of a row which still image reading scanning doesn't reach.

After completing reading of charge of all pixels of the image-pickup element 3 (FIG. 18(9)), overlapping of the blade group 230 is completed and the aperture 201p is the opening state. And, the second photointerrupter 207b is the state outputting H light from the state outputting L signal and the shutter driving circuit 11 stops energization to the motor 220 (FIG. 18(10)). As a result, the blade driving member 202 is the overcharge state again.

When the charge operation ends, the CPU 9 starts the live view taking picture operation for the electronic viewfinder function.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-143327, filed on Jun. 26, 2012, and 2012-143514, filed on Jun. 26, 2012, which are hereby incorporated by reference herein in their entirety.

What is claimed is:

1. A shutter apparatus comprising:
   a shutter base plate having an aperture for exposure;
   a blade group configured to open and close the aperture;
   a blade driving member configured to drive the blade group;
   a driving spring configured to urge the blade driving member;
   a charge lever configured to rotate the blade driving member so as to charge the driving spring;
   a first roller which is attached to a first axis portion extending from the blade driving member and abuts against the charge lever;
   a cam member configured to rotate the charge lever; and
   a second roller which is attached to a second axis portion extending from the charge lever and is configured to trace a cam portion formed on the cam member,
   wherein the cam member has a flange protruding from the cam portion to periphery of the cam member, and
   wherein the cam member is arranged so that the second roller is overlapped with the flange in an extending direction of the second axis portion.

2. The shutter apparatus according to claim 1, wherein a rotational amount of the charge lever is adjusted by an outside diameter of the second roller.

3. The shutter apparatus according to claim 1, wherein a distance from a rotating center of the charge lever to an abutment abutting against the first roller is longer than a distance from the rotating center of the charge lever to an abutment abutting against the second roller.

4. The shutter apparatus according to claim 1,
   wherein the charge lever is further from a center of the aperture than the blade driving member in a horizontal direction, and
   wherein the cam member is closer the center of the aperture than the blade driving member in the horizontal direction.

5. The shutter apparatus according to claim 1, further comprising:
   a blade arm member configured to rotatably hold the blade group;
   wherein the shutter base plate has a third axis portion,
   wherein the blade driving member is supported rotatably by the third axis portion, and drives the blade arm member by rotating around the third axis portion,
   wherein both the blade arm member and the blade driving member are arranged on the same side of the shutter base plate, and
   wherein the blade arm member is fixed on the blade driving member and rotates around the third axis portion.

6. The shutter apparatus according to claim 1,
wherein the blade driving member has an axis supporter supported rotatably by the third axis portion, and
wherein periphery of the axis supporter fits into a hole portion formed on the blade arm member so as to fix the blade arm member to the blade driving member.

7. An image-pickup apparatus comprising:
the shutter apparatus according to claim 1.

\* \* \* \* \*